United States Patent [19]

Hedenberg

[11] Patent Number: 5,146,840
[45] Date of Patent: Sep. 15, 1992

[54] AUTOMATIC BAKING APPARATUS AND MIXBAG THEREFORE

[75] Inventor: Rolf P. Hedenberg, Maspalomas City, Spain

[73] Assignee: Heden-Team AG, Triesenberg, Liechtenstein

[21] Appl. No.: 751,672

[22] Filed: Aug. 23, 1991

Related U.S. Application Data

[62] Division of Ser. No. 440,195, Nov. 22, 1989, abandoned.

[51] Int. Cl.$^5$ ............................................. A47J 37/01
[52] U.S. Cl. ........................................ 99/328; 99/326; 99/341; 99/348; 99/353; 99/426; 206/219; 206/221; 366/240
[58] Field of Search ................... 99/325–328, 99/341, 348, 352, 353, 426, 449, 342; 366/69, 130, 143, 145, 146, 149, 219, 240, 341, 349, 602; 222/94, 98, 100–102; 206/219, 221; 383/38; 426/128, 233, 392, 394, 405

[56] References Cited

U.S. PATENT DOCUMENTS

| | | | |
|---|---|---|---|
| 3,064,802 | 11/1962 | Jess et al. | 206/219 |
| 3,077,262 | 2/1963 | Gaste | 206/221 |
| 3,214,064 | 10/1965 | Raiha | 222/100 |
| 3,543,966 | 12/1970 | Ryan et al. | 222/94 |
| 3,830,475 | 8/1974 | Inoue et al. | 206/219 X |
| 3,939,972 | 2/1976 | Mayworm | 206/219 |
| 3,983,994 | 10/1976 | Wyslotsky | 206/219 |
| 4,538,509 | 9/1985 | Ojima et al. | 99/352 X |
| 4,548,606 | 10/1985 | Larkin | 222/94 X |
| 4,550,653 | 11/1985 | Hedenberg | 99/348 |
| 4,550,654 | 11/1985 | Hedenberg | 99/348 |
| 4,590,850 | 5/1986 | Hedenberg | 99/348 |
| 4,803,086 | 2/1986 | Hedenberg | 426/87 |

FOREIGN PATENT DOCUMENTS

| | | |
|---|---|---|
| 0295204 | 12/1988 | European Pat. Off. |
| 2423413 | 11/1979 | France |
| 364073 | 10/1962 | Sweden |
| 8605713 | 10/1986 | World Int. Prop. O. ............ 366/69 |

Primary Examiner—Harvey C. Hornsby
Assistant Examiner—Mark Spisich
Attorney, Agent, or Firm—Fleit, Jacobson, Cohn, Price, Holman & Stern

[57] ABSTRACT

An automatic baking apparatus for making food products in piece form from dough-like substances which apparatus has holding means adapted to be fixed to the top and bottom edges of a flexible sealable mixbag (100) containing dry ingredients and water. The baking apparatus has upper and lower drums (230,232) and means for moving the drums, and the mixbag has male protrusions (134, 134a) at the upper and lower edges so that the mixbag (100) can be attached respectively to the upper and lower drums (230, 232). The holding means on the upper and lower drums is in the form of a female groove (234, 234a) commensurate in shape with the male protrusions (134, 134a) on the mixbag so that the mixbag male protrusions can be detachably interlocked with the female grooves on the drums. In this way the mixbag is attached to the drums for a kneading process in the baking apparatus and after the kneading process is completed, the mixbag is rolled up onto the lower drum (232). Furthermore, the mixbag (100) has a specially shaped permanent seal (104, 116) in the lower portion thereof which permits dry ingredients located above this specially shaped permanent seal to more easily burst a burstable seal (108, 119). Furthermore, the mixbag has two machine readable indicia (121a, 121b) to be read by scanning means (270) in the baking apparatus, the first indicia (121a) informs the baking apparatus that the particular mixbag is suitable for operation in the baking apparatus, and the second indicia (121b) programs into the baking apparatus the receipt for the ingredients contained in the mixbag.

15 Claims, 3 Drawing Sheets

AUTOMATIC BAKING APPARATUS AND MIXBAG THEREFORE

This is a continuation of application Ser. No. 07/440,195, filed Nov. 22, 1989, now abandoned.

BACKGROUND OF THE INVENTION

This invention relates to a mixbag of and a baking apparatus for automatically making food products such as bread, cakes and the like.

The invention is more particularly related to a mixbag and a baking apparatus for automatically making food products in piece form from dough-like substances. The apparatus comprises a housing containing a holding mechanism in the form of male/female attachment means adapted to hold either end of a flexible sealable mixbag containing the ingredients for the dough-like substance, and a dough preparation station having upper and lower slit openings. Kneading means are included for mechanically working the ingredients in the mixbag, and the apparatus provides for relative movement between the mixbag and the kneading means so that the ingredients are kneaded into a dough-like substance. A heat treatment station is in the housing in which the kneaded dough-like substance is baked.

Baking, e.g. bread for household purposes, is a relatively complicated, time consuming, work intensive and messy business. Due to the fact that the quality of the bread to a certain extent depends on the fermentation time and that the fermentation procedure has to be performed under the correct conditions which takes a relatively long time, there are few people who have the privilege of eating fresh home-made bread.

DESCRIPTION OF THE PRIOR ART

An automatic baking apparatus and mixbag therefore is shown in U.S. Pat. Nos. 4,550,653; 4,550,654; 4,590,850 and 4,803,086. These patents teach various embodiments for automatically kneading and baking bread, but fail to teach or suggest a male/female attachment means for removably attaching the mixbag onto the moving means.

SUMMARY OF THE INVENTION

If the baking apparatus is to be of practical use it should be able to cope with variations in the type and quality of the ingredients used and be able to produce a variety of baked products. There is then a need to provide the baking apparatus with the necessary instructions to take account of these variations in a reliable and effective but uncomplicated and elegant manner.

The invention is defined in the claims below to which reference should now be made.

One embodiment of this invention is to a flexible sealable mixbag being permanently sealed along three of its sides and open at the top. The mixbag has a peelable or burstable seal intermediate the top and bottom for separating dry ingredients and water, which burstable seal at the appropriate time is burst with internal pressure and the dry ingredients are hydrated. Furthermore, the top and bottom edges of the mixbag have male protrusions and these are adapted to interlock with commensurately shaped female grooves on the moving means of the baking apparatus.

Another embodiment of this invention is a baking apparatus of the kind described in the prior art, but which has female grooves as the holding means on the drums forming the moving means. These female grooves are commensurate in shape to the male protrusions on the mixbag and allow easy attachment and removal of the mixbag from the drums of the baking apparatus.

DESCRIPTION OF THE PREFERRED EMBODIMENTS

The baking apparatus illustrated is basically of the type described in U.S. Pat. No. 4,803,086 and consists of moving means 230,232, a flexible mixbag 100 attachable thereto and a common dough preparation and heat treatment station 212. The whole arrangement is located inside a thermally insulated housing.

Figure 4:
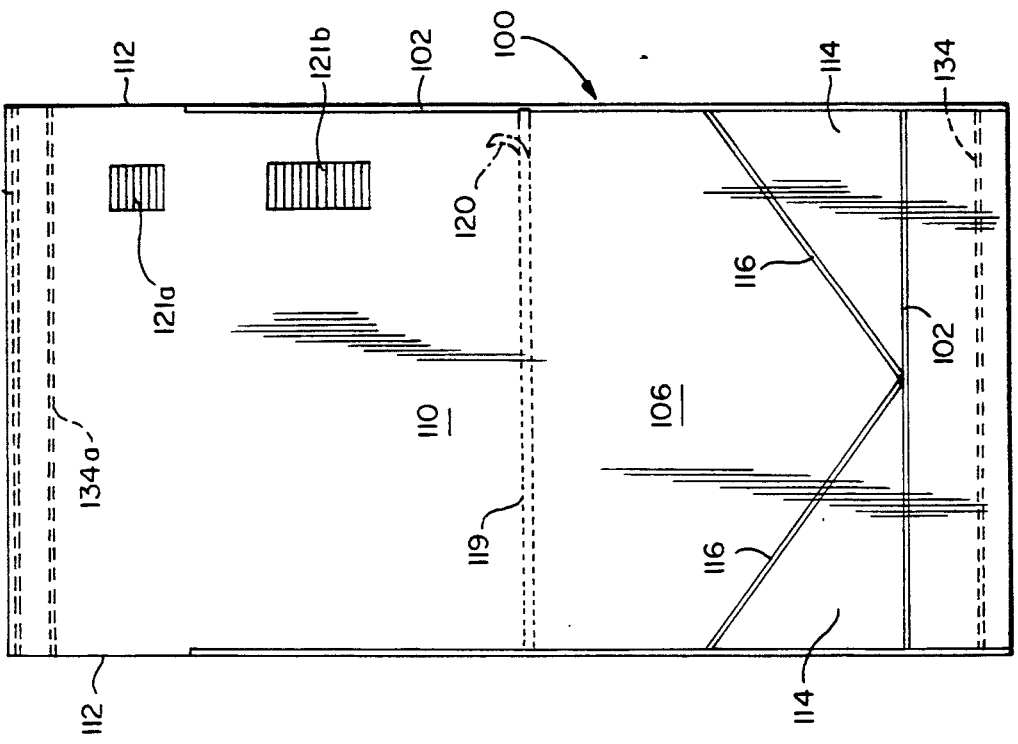
FIG. 4 is a front elevation of a second embodiment of the mixbag.
Figure 3:
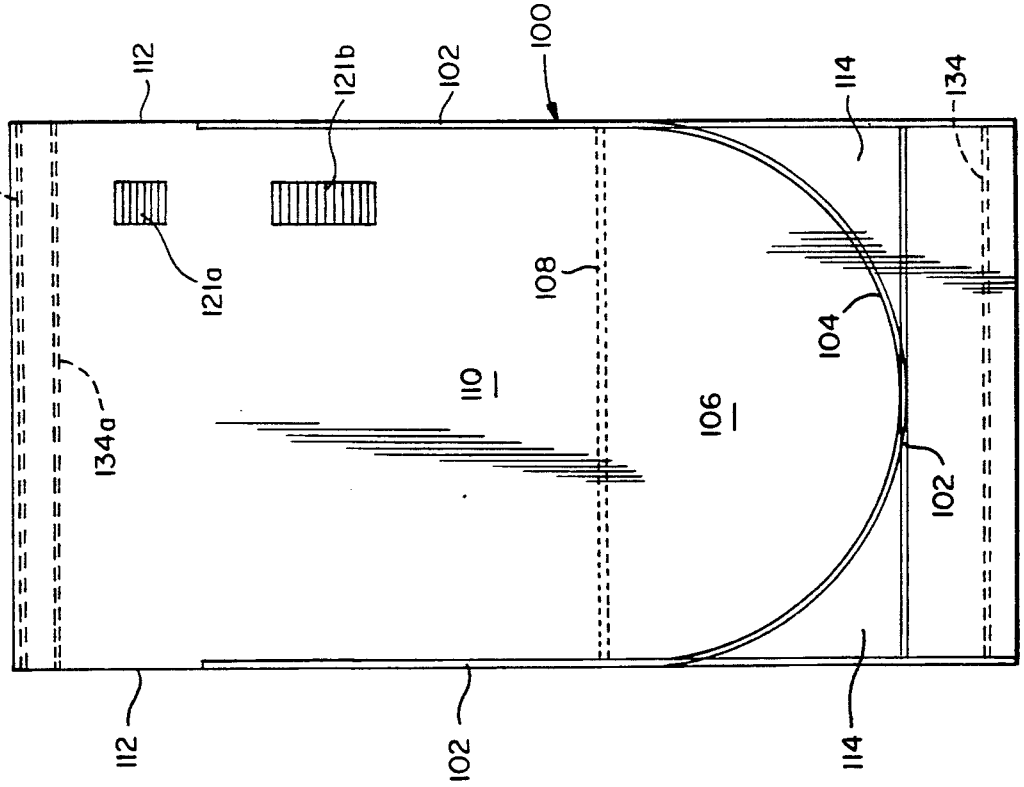
FIG. 3 is a front elevation of a first embodiment of the mixbag.

The flexible bag 100, embodiments of which are shown in FIGS. 3, 4, is used as a transportation package for the dry ingredients from the producer to the user and as a vessel during the preparation of the dough. The bag 100 must therefore withstand rough mechanical treatment and preferably also contains a separate compartment, in which is contained the liquid required for preparation of the dough. The compartments containing the dry ingredients and the liquid respectively are separated by e.g. a weld joint or burstable seal which is burst when the kneading operation starts. The liquid, i.e. water, for the dough is usually added by the user, but can be prepackaged.

A programmer interrupts the dough preparation after an empirically predetermined dough preparation time so that no overworking of the dough occurs which could lead to dry bread. A heater (not shown) surrounding the heat treatment station 212 can be started during the preparation of the dough in order to obtain an appropriate fermentation temperature. The dough can be made to ferment several times possibly interrupted by new kneading operations, depending upon the program in the programmer. When the fermentation of the dough is finished, the baking takes place directly in the combined dough preparation and baking station 212.

Figure 1:
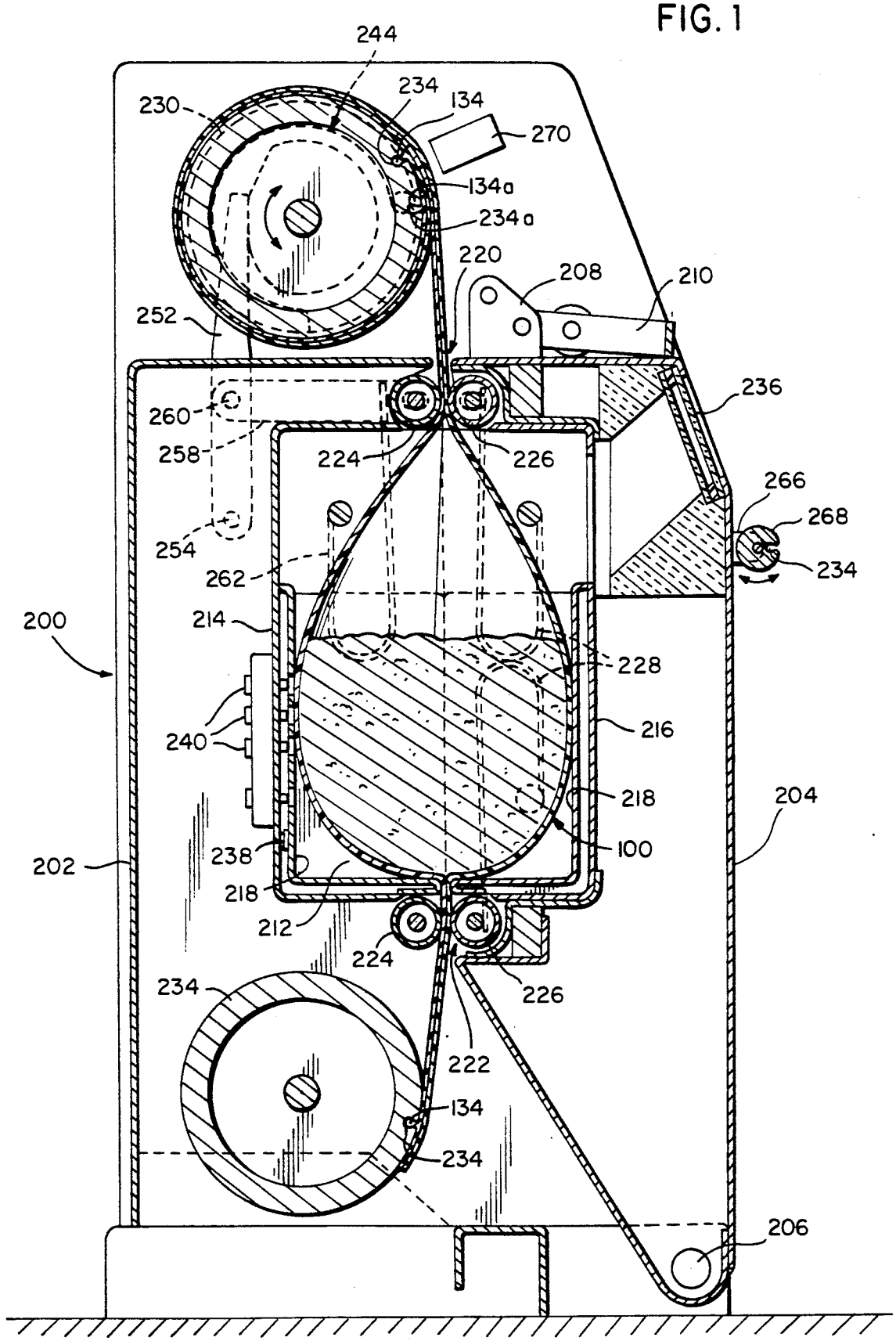
FIG. 1 shows a section through the baking apparatus.
Figure 2:
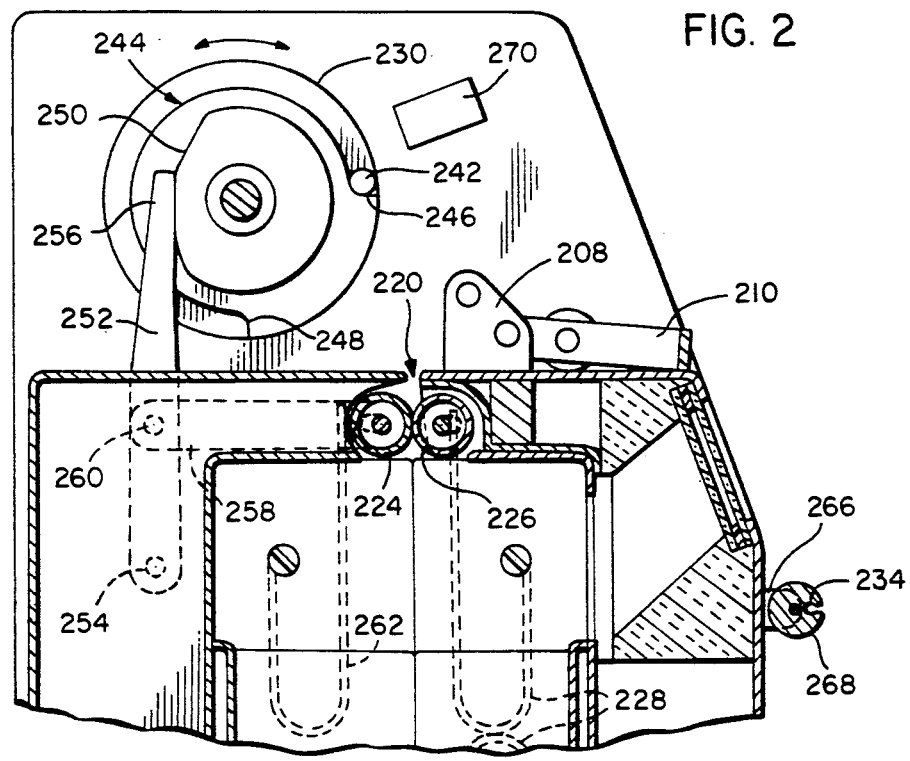
FIG. 2 shows the upper part of the baking apparatus showing one end of the drum.

The baking apparatus 200 illustrated in FIGS. 1 and 2 comprises two housing halves 202,204, of which one half 204 is openable by pivoting about a pivot 206. Latch means 208 are provided incorporated with the opening handle 210 to hold the housing closed. The kneading and baking chamber 212 is formed in two opposed parts 214,216 of the fixed and openable halves of the machine and linings 218 are provided in the open portion of the chamber 212, namely the lower part thereof, and perferably have a non-stick coating on them. The chamber 212 has a slit opening 220 at its top and another slit opening 222 at its bottom formed on the join line of the two halves and each comprising opposed rolls 224 on the fixed part and 226 on the openable part of the housing halves. The rolls 226 are biased by springs 228 towards the opposed rolls 224 on the fixed part.

Figure 5:
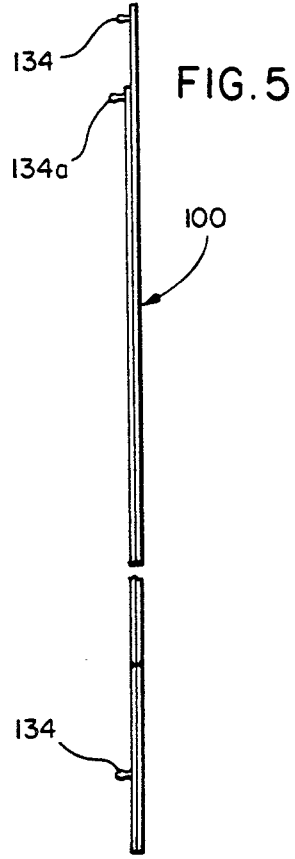
FIG. 5 is a side elevation of both embodiments of the mixbag showing the male protrusions.

The mixbag 100 runs between the rolls and extends over an upper cylindrical drum 230 and a lower cylindrical drum 232. The drums are driven together to move the bag up and down during the kneading operation. The drums 230 and 232 are provided across their longitudinal periphery with female grooves 234. These grooves are commensurate in shape and size with male protrusions 134 at the top and bottom edges of the mixbag 100, see FIGS. 3, 4 and 5. The upper drum 230 is provided with two female grooves as seen in FIG. 1, and the two flat faces of the mixbag 100 have different longitudinal lengths, the flat face adjacent the drum 230 being of shorter longitudinal length and thereby its male protrusion 134a fits into the lower female groove 234a. The outer flat face of the mixbag 100 is longer and in this way it can be interlocked into the upper female groove 234 after the attaching of the male protrusion on the shorter flat face of the mixbag. With regards to attaching the mixbag 100 to the lower drum 232, the mixbag 100 has towards its lower edge a single male protrusion 134 which is interlocked into female groove 234 in drum 232. The attachment sequence of the mixbag 100 to the upper and lower drums is simple and convenient. First the user attaches the inner shorter flat face of the mixbag to the lower female groove 234a on the upper drum 230. This allows the mixbag 100 to hang downwardly from the upper roll 230 so that the lower edge of the mixbag is adjacent to female groove 234 on the lower drum 232. Of course, when the mixbag is being positioned into the baking apparatus, the housing half 204 is in the open position, being pivoted open about its pivot 206. The lower male protrusion 134 of the mixbag 100 is then gently pressed into the commensurately shaped female groove 234 in the lower drum 232 so as to secure the mixbag 100 in the baking apparatus and allow the top portion of the mixbag to be openable noting that the second male protrusion at the upper edge has not yet been interlocked with the upper female groove 234. At this point in time, assuming the mixbag 100 came with hermetically sealed dry ingredients in space 106 and a burstable seal 108 (see FIG. 3), then the appropriate amount of water can be added into area 110. Alternatively, if the user wants to create his or her own bread recipe, then the user can introduce dry ingredients into the mixbag; remove a protective strip over adhesive bands on the inner surfaces of the mixbag as will be discussed with relation to FIG. 4; can push the adhesive bands together so as to form a burstable seal; and then place the appropriate amount of water on top of the so-formed burstable seal. Once the dry ingredients and water are present in the mixbag, then the second male protrusion 134 on the upper edge of the mixbag is interlocked with the upper female groove 234 on the upper roll 230 which completes the installation of the mixbag into the baking apparatus. After the kneading is completed, the upper drum 230 stops reciprocating and begins to revolve in a clockwise rotation as does the lower drum 232. The two male protrusions on the upper edges of the mixbag 100 are pulled from the female grooves of the upper drum 230 and are then pulled through the rollers 224 and 226 and the mixbag 100 is wound up on the bottom drum 232. This removes the mixbag from the chamber 212 and by virtue of the bottom set of rollers 224 and 226, the kneaded dough is squeezed from the mixbag as it exits between the nip of these two rollers and is deposited in the lining 218 which is preferably a Teflon lined baking pan. The housing has a window 236 to allow the user to look into the oven and a light (not shown) to illuminate the interior of the chamber, operated by a push-button switch (not shown) so that it is only on when the user is actually looking inside. Otherwise the heat from the lamp can upset the temperature. A temperature sensor 238 is provided in the oven as are height sensors 240, being either photocells or taking the form of moisture sensors to sense contact with the damp dough.

A bar code scanner 270 reading a bar code 121 applied or printed on the upper portion of the bag 100 (see FIG. 3) is arranged just opposite the upper drum 230. The bar code 121 contains the baking program, such as mixing and kneading time, speed of the drum 230, fermentation time and temperature, baking time and temperature, steam generation etc. The bar code scanner 270 initiates the programmer which takes care of the whole production process. It is important to note that the bar code 121 is read as the mixbag 100 is initially wound up on the drum 230 so the mixbag is not stretched which can damage the bar code symbols.

The bar code scanner preferably comprises a CCD (charge coupled device) line scan image sensor. The output of the scanner feeds the programmer which can comprise any suitable commercially available microprocessor to provide fixed and/or volatile stored program control appropriate to the type of bread etc. being baked. There are almost unlimited parameters in the kneading, fermentation add baking operations. For example, in a typical bread-making sequence the bag will initially be moved between the rolls to break the burstable seal and then kneaded while the water penetrates the dry ingredients. The kneading may take place at a high speed continuously or at a lower speed and intermittently. After the first kneading operation there will then normally be a rising period during which the dough rises. This can be followed by a second kneading and the final rising taking place in the baking tray after which baking commences. Baking continues for a set time and temperature, during which steam may or may not be introduced.

The duration of all these operations have to be set. Wide variation in the parameters is permissible and necessary, depending upon the type of bread to be produced and the nature of the flour and additional ingredients used. In particular differences will arise depending upon the relative proportions of wheat and rye flour. The necessary parameters can only effectively be determined empirically.

It will be seen, therefore, that there is a need to instruct the baking machine as to what these parameters are. For the user who wishes to make their own mix, it is possible for the baking machine to hold several sets of predetermined parameters for a range of breads and then it is only necessary to instruct the machine to select the appropriate set.

The bar code scanner 270 reads the bar code 121 on the mixbag to obtain information from the mixbag as to which parameters are required for that particular mixbag. The bar code is read with the mixbag conforming around the surface of the upper rotatable drum 230 so that it is evenly spread out and thus reliably read, but is not yet stretched by the kneading such as might distort the bar code. Furthermore, because the mixbag is driven by the motor at a set speed, the bar code passes under the scanner 270 at a constant and even speed, again enabling very reliable reading.

Preferably the bar code or other indicia being read on the mixbag comprises two parts. The first or identification part (see FIG. 3 121a) serves to identify that the bag is an appropriate bag for that type of machine, and is a mixbag that the machine can operate with. Thus this first indicia 121a enables the microprocessor so that it can be programmed by the second indicia 121b or part of the bar code. The second or command indicia then instructs the microprocessor in relation to the appropriate baking sequence for that mixbag. The microprocessor only responds to the second indicia if the scanner has detected an appropriate first indicia.

The total length of the bar code can be of the order of 30 digits. If the first part of the bar code is the first or identification indicia referred to above, then typically the first 5 to 15 digits can constitute the first indicia, and this can correspond to a number identifying the particular supplier of the bag in accordance with a standard article numbering scheme. The remaining digits constitute the second or command indicia. The code used can conveniently be that known as the interleaved 2 of 5 code.

Other means than bar codes can be used for either or both the identification and command indicia discussed above. One may be a bar code and the other a characteristic design or figure. As noted above the command indicia can comprise the full kneading and baking parameters required, or indicate a selected one of a plurality of preprogrammed parameters.

The arrangement for opening and closing the slit 220 is shown in more detail in FIG. 2. The drum 230 carries a pin 242 which rotates with the drum. Loosely mounted on the same shaft as the drum is a cam member 244 which has two portions. The first portion provides two abutments 246,248 which can bear against the pin 242, these abutments being spaced to permit the pin to rotate freely through about 270 degrees relative to the cam member. The second portion of the cam member 244 is axially spaced from the first and provides a cam surface 250. A lever 252 pivoted about a fixed pivot 254 has an end portion 256 which bears against the cam surface 250. A connecting rod 258 is pivoted at 260 to an intermediate portion of the lever 252 and is connected by a lost-motion pin and slot connection to the roll 224. A spring 262 bears against the roll 224 to bias it towards the opposed roll 226. The entire arrangement is duplicated at the other end of the drum.

In the position shown in FIG. 2 the bag is assumed to be at the bottom of its travel. During the last part of its movement it has moved the cam member 244 to the position shown so that the lever 252 and connecting rod 258 are moved to the right, allowing the spring 262 to force the roll 224 against the roll 226 to close the slit. When the bag then moves up again the pin will rotate until it strikes the other abutment surface 248. This rotates the cam member 244 to move the lever 252 and connecting rod 258 to the left thus pulling the roll 224 away from the roll 226 against the spring 262 and opening the slit 220. The cam surface 250 has two flat portions against which the lever 252 bears at the upper and lowermost positions of the bag. The use of such flat portions rather than a continuous curve assists in stopping undesired rotation of the cam member 244 as the drum 230 commences its reverse rotational movement.

FIG. 3 shows the first embodiment of the mixbag in accordance with the instant invention. The sheet or foil of which the mixbag is made may be a sandwich structure preferably of biaxially oriented polyamide and low density polyethylene or of polyester or polyester/polyethylene compound or composite sheets. The mixbag is permanently sealed by welding or otherwise adhering the two flat faces together along the bottom edge and the two longitudinal sides, see 102 in FIG. 3. The permanent seal 102 preferably does not go all the way to the top edge of the mixbag, but rather, at the top portion the two flat faces of the mixbag are open on the sides as indicated at 112 in FIG. 3. The mixbag 100 has three male protrusions 134 all oriented in the same direction (see FIG. 5), two male protrusions 134, 134a at the top edges of the mixbag and one on the bottom edge. It will be seen in FIG. 3 that the flat surface of the mixbag closest the viewer is longitudinally longer than the flat surface of the mixbag away from the viewer noting that male protrusion 134a is in hidden line. Furthermore, the male protrusions 134, 134a extend across the width of the mixbag. The mixbag has a further permanent seal 104, in this case an arcuate seal being concave from the inside of the mixbag, which permanent seal 104 forms an area 106 for containing dry ingredients. The dry ingredients are hermetically sealed by a burstable seal 108 and water is placed into the area 110 inside the mixbag. There are two indicias on the mixbag, the upper indicia 121a and the lower indicia 121b as discussed below. The spaces 114 are empty and are sealed off by permanent seals 102 and 104.

The second embodiment of the mixbag is seen in FIG. 4 and this embodiment is basically the same as FIG. 3 with the following exceptions. The permanent seal 116 is in the form of two declining linear seals each starting from their respective longitudinal side seals 102 and declining and joining at the appropriate mid-section at the bottom portion of the mixbag to form a "V". The burstable seal 119 is placed slightly higher in the mixbag than burstable seal 108 in FIG. 3 and indeed, the embodiment of FIG. 4 has a peelable seal 119 and a protective strip 120 which eventually forms a burstable seal. The mixbag as drawn in FIG. 4 is empty, and at 119 there are adhesive bands covered by a protective strip 120. This empty mixbag is provided to the users who wish to create their own recipes. The user mounts the mixbag in the baking apparatus 200 by top male protrusion 134a and introduces the appropriate dry ingredients into area 106. Then the user removes the protective strip 120 thereby exposing the adhesive bands 119 on the two inner side faces of the mixbag. The user then presses the now exposed adhesive bands 119 against each other to form a burstable seal 119 of the nature of the burstable seal 108 of FIG. 3. The reason that the adhesive bands are placed at a high level in the mixbag relative to the burstable seal 108 of FIG. 3, is care must be taken when the protective strip 120 is removed not to allow the dry ingredients to get onto the adhesive bands. Once the adhesive bands are pressed together to form a burstable seal 119, then water is placed into area 110; the upper male protrusion 134 is interlocked with the upper female groove 234 on drum 230; the openable half 204 of the baking apparatus is then closed and latched and the kneading and baking sequence commences.

Figure 6:
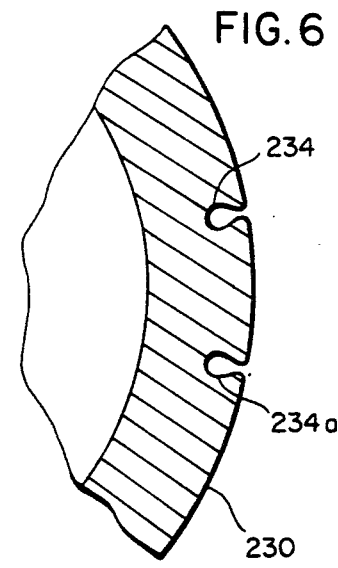
FIG. 6 is a partial section of the upper drum showing a first embodiment of the female groove.
Figure 7:
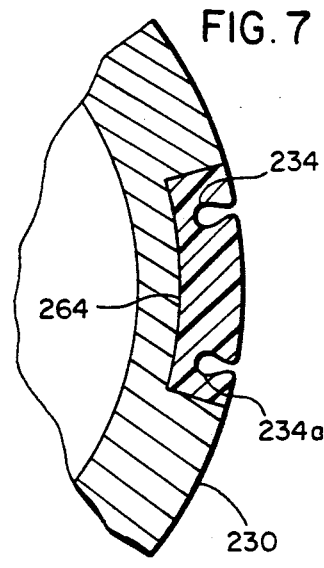
FIG. 7 is a partial section of the upper drum showing a second embodiment of the female groove.

FIGS. 6 and 7 show two different embodiments of the female grooves 234 on the upper drum 230. The same embodiments are also applicable to the lower drum 232. The first embodiment (FIG. 6) shows that the female grooves 234, 234a are formed by removing material of the drum 230 which is preferably aluminum, but could be made of an appropriate plastic. The second embodiment, as seen in FIG. 7, shows that a channel has been formed in the outer periphery of the drum 230 and into this channel has been placed an insert 264 of a different material, which insert has the female grooves 234, 234a. These female grooves 234, 234a in either embodiment, are commensurate in shape with the male protrusions 134, 134a so that there is a mechanical interlock when the enlarged portion of male protrusion 234, 234a is forced into the necked entrance of a female grooves 234, 234a. Dependent upon the choice of materials of the drums, it may or may not be necessary to use the insert as seen in FIG. 7.

It is important to understand the reasoning of the shapes of permanent seal 104 of FIG. 3 and 116 of FIG. 4. By virtue of these shapes, the dry ingredients in area 106 are first contacted by the nip of the lower rollers 224 and 226 and the slit 222 in an area less than the total width of the mixbag as the mixbag decends through the lower slit 222. As the rollers force the dry ingredients upwardly on the downward reciprocation of the mixbag in the baking apparatus, the particles of the dry ingredients in the center of the mixbag are moved upwardly and the greatest force vectors are in the middle of the bag thereby placing a concentrated upward force at the middle of the burstable seal 108/119. This is in essence a hydraulic effect wherein the particles of the dry ingredients, like the molecules of the hydraulic liquid, are forced in a given direction. The burstable seal is usually burst before half of the longitudinal depth of area 106 has been worked on by the rollers. In this way the amount of force to draw the mixbag through the rollers to break the burstable seal is lessened and the amount of tension placed on the mixbag is concentrated at the center of the mixbag. It is to be understood that the concave configuration of FIG. 3 is the preferred embodiment since there is the maximum volume with this configuration in area 106. Insofar as the linear embodiment where FIG. 4 is concerned, it is necessary that the permanent seals 116 incline from the horizontal permanent seal 102 at an angle empirically sufficient to be usable with the motor of the baking apparatus and the tensile strength of the mixbag.

In the embodiment of FIG. 4 which has the adhesive bands 119 and the protective strip 120, it is necessary, after removing the protective strip 120 to firmly press the adhesive bands together so as to achieve a uniform burstable seal across the entire width of the mixbag 100. This burstable seal 119 must hermetically seal the dry ingredients in area 106 so that when the water is placed in area 110, it does not hydrate the dry ingredients until the burstable seal is burst. In order to assist the user in doing this, a rod 268 rotatably mounted in brackets 266 (see FIG. 1) is mounted on the front face of the baking apparatus. The rod 268 is longer than the mixbag is wide and the rod 268 has a female groove 234 in it. The user can then take the empty mixbag as seen in FIG. 4 and mount the mixbag by means of male protrusion 134a onto the rod 268. This then permits the user to introduce the dry ingredients into the top of the mixbag; reach in and remove protective strip 120; and then firmly press the adhesive bands 119 against the front planar face of the baking apparatus which allows even pressure to be applied and thereby enables the burstable seal 119 to be easily formed. Then the mixbag with the hermetically sealed dry ingredients in area 106 is removed from the rod 268; the baking apparatus is opened up and the mixbag is attached to the upper drum 230 by means of male protrusion 134a. The water is then introduced and the upper male protrusion 134 is interlocked into the female groove 234 and the lower male protrusion 134 is attached to lower drum 232. The rod 268 is preferably rotatable in the bracket 266 so that when the female groove 234 is not in use, the rod 268 can be rotated 180 degrees and no foreign material will be able to enter into the female groove. When the user again wishes to use a bag with a protective strip, the rod 268 is rotated into the operable position again and the process repeated.

The invention is not limited to the embodiments described and shown, but a plurality of modifications and combinations of details from the different embodiments are possible within the scope of the claims.

I claim:

1. A flexible sealable mixbag adapted to contain dry ingredients and water for making a food product in piece form from dough-like substances by kneading and baking in a baking apparatus, the mixbag having top and bottom edges each having a width and two longitudinal sides extending between said top and bottom edges defining two opposed faces having top and bottom portions; a permanent seal in the bottom portion and along the two longitudinal sides; and at least one male protrusion along the width at the top portion of said mixbag and projecting from the plane of said face, which male protrusion is adapted to engage with at least one commensurately shaped female groove in the outer periphery of a top drum in the baking apparatus for detachably holding said mixbag onto the drum during a kneading operation.

2. The mixbag as claimed in claim 1 wherein the faces of said mixbag are of different longitudinal lengths so that one face is longer than the opposite face at the top portion of said mixbag; said at least one male protrusion is provided across the top portion of each face and each male protrusion is adapted to detachably fit into the commensurately shaped female grooves in the top drum of said baking apparatus.

3. The mixbag as claimed in claim 2 wherein the bottom portion of said mixbag also has a male protrusion across the bottom width thereof and this male protrusion is also adapted to detachably fit into a commensurately shaped female groove in a bottom drum of said baking apparatus.

4. The mixbag as claimed in claim 3 further containing a second permanent seal attaching the two flat faces together at the bottom portion of said mixbag above said bottom permanent seal, said second permanent seal extends between said two longitudinal side permanent seals in a curvilinear path being concave towards the top of said mixbag.

5. The mixbag as claimed in claim 3 further containing a second permanent seal attaching the two flat faces together at the bottom portion of said mixbag above said bottom permanent seal, said second permanent seal extends between said two longitudinal side permanent seals in two declining linear paths, each path starting from each longitudinal side permanent seal and joining at the approximate mid-section of the bottom portion of said mixbag.

6. The mixbag as claimed in claim 3 further containing dry ingredients in said bottom portion of said mixbag; a burstable seal extending across said mixbag from said two longitudinal side permanent seals to hermetically seal said dry ingredients; and at least one of said two longitudinal side permanent seals stops short of said lower male protrusion at the top portion of said mixbag so as to permit venting.

7. The mixbag as claimed in claim 3 wherein the two opposed faces each have inner surfaces and further containing water and having an adhesive band on each inner surface of said faces of the mixbag, said adhesive band on one inner surface being positioned opposite the adhesive band on the other inner surface; a protective strip covering at least one of said adhesive bands to prevent the two faces of each mixbag from adhering to each other until said adhesive strip is removed whereby the two adhesive bands adhere to form a burstable seal, said water being located above said burstable seal and said burstable seal precluding said water from intermingling with dry ingredients located below said burstable seal.

8. The mixbag as claimed in claim 3 made of a plastic selected from a group consisting of polyamide, polyethylene and combinations thereof; polyester, polyethylene and combinations thereof; the plastic having low water permeability and extendibility, being flexible and resistant to puncture, and capable of supporting a burstable seal and a male protrusion.

9. The mixbag as claimed in claim 3 further containing on the outer surface of one face at least one machine-readable indicia adapted to provide information to said baking apparatus.

10. The mixbag as claimed in claim 9 further containing a second machine-readable indicia; the first indicia being adapted to identify the mixbag as suitable for said baking apparatus and adapted to open up a memory means in said baking apparatus; the second indicia being adapted to provide a recipe to said baking apparatus to control its kneading and baking operations.

11. Baking apparatus for making a food product in piece form from dough-like substances, comprising a housing containing holding means affixed to a top and bottom portion of a flexible sealable mixbag having two faces each having inner and outer surfaces and containing dry ingredients and water for the dough-like substance, kneading means for mechanically working the ingredients in the mixbag and including moving means for creating relative movement between the mixbag and the kneading means so that the ingredients are kneaded into a dough-like substance, and heat treatment means for baking the kneaded dough-like substance, the improvement comprising said moving means being in the form of drums having a longitudinal length located above and below said mixbag; said holding means being at least one female groove in the outer peripheries of said drums running the longitudinal length thereof and engaging with at least one male protrusion of commensurate shape, the male protrusion projecting from said face outer surface on at least the top portion of said mixbag to detachably engage with the female groove so as to hold said mixbag to said drum during the kneading operation.

12. The baking apparatus as claimed in claim 11 wherein said upper drum has two substantially parallel female grooves in it and said bottom drum has one female groove in it, all grooves detachably engaging said at least one commensurate shaped male protrusions on the top and bottom portions of the same face of said mixbag thereby allowing the other face of said mixbag to define an opening at the top thereof until a second commensurately shaped male protrusion located on the top portion of said other face inner surface is detachably engaged with said second female grooves on the top drum.

13. The baking apparatus as claimed in claim 11 wherein the female grooves in at least one of the drums is formed of a length of material different from that of the drum, which material is affixed within a channel in the outer periphery of the drum.

14. The baking apparatus as claimed in claim 11 the improvement further comprising an auxiliary female groove formed on the outer surface of said housing which is commensurately shaped to said at least one male protrusion and allows the male protrusion on the top portion of one of the faces of said mixbag to be detachably engaged in said auxiliary female groove allowing the other face of said mixbag to define an opening at the top thereof permitting dry ingredients and/or water to be introduced into said mixbag.

15. The baking apparatus as claimed in claim 14 wherein said auxiliary female groove is located on the outer surface of said housing so as to be convenient to an operator and so that there is a substantially vertical expanse of housing below said auxiliary female groove such that said mixbag rests on said vertical expanse, thereby allowing said mixbag, which has two adhesive bands across its inner face surfaces and both hands are covered by a protective strip, to be filled with dry ingredients, the protective strips are removed and the two exposed adhesive bands are pushed together against said vertical expanse to form a burstable seal above said dry ingredients, then water is placed above said burstable seal.

* * * * *